May 14, 1940.  T. D. PARKIN  2,200,517

DIAL INDICATOR APPARATUS

Filed Oct. 5, 1938

INVENTOR
THOMAS DIXON PARKIN
BY
ATTORNEY

Patented May 14, 1940

2,200,517

UNITED STATES PATENT OFFICE 2,200,517

DIAL INDICATOR APPARATUS

Thomas Dixon Parkin, Broomfield, near Chelmsford, England, assignor to Radio Corporation of America, a corporation of Delaware Application October 5, 1938, Serial No. 233,377
In Great Britain November 3, 1937

5 Claims. (Cl. 116—124.3)

This invention relates to dial and like indicator apparatus for accurately indicating the position of adjustment of an adjustable device such, for example, as a tuning reactance in a wave meter, radio transmitter or radio receiver. The main object of the invention is to provide improved and simple indicator apparatus which will give direct reading to a predetermined degree of accuracy and which shall be easier to read than the usual vernier indicator arrangements.

According to this invention an indicator apparatus comprises a main scale member arranged to be driven with the device whose movements are to be indicated, said main scale member having a predetermined ratio of speed of movement (usually one to one) with respect to said device, a second scale member marked with scale divisions corresponding to those of the main scale member, means for driving the second scale member with the first scale member but at a higher speed of movement, and a reading member whereby the positions of both scale members relative to said reading member can be read off.

Preferably the scale members are in the form of concentric dials with their scales adjacent one another and the reading member is a fixed hair line or the like extending across both scales.

Figure 1:
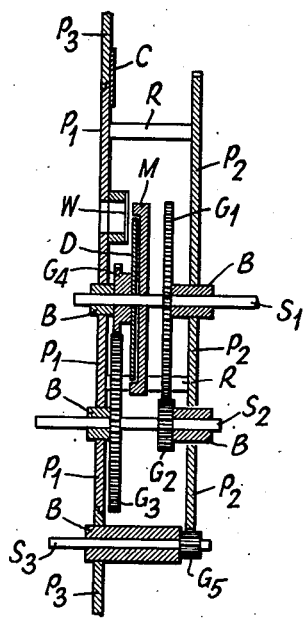
Figure 2:
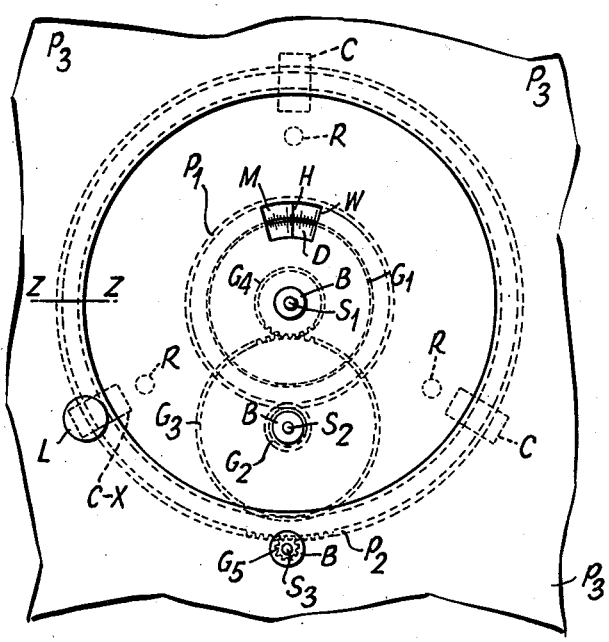
Figure 3:
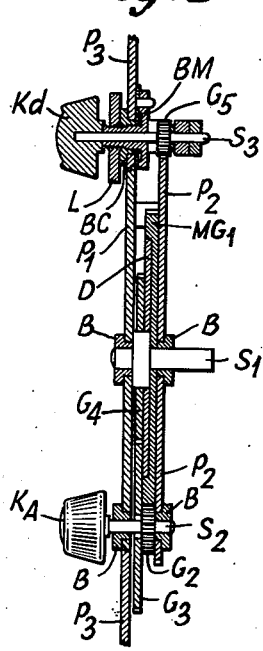
Figure 4:
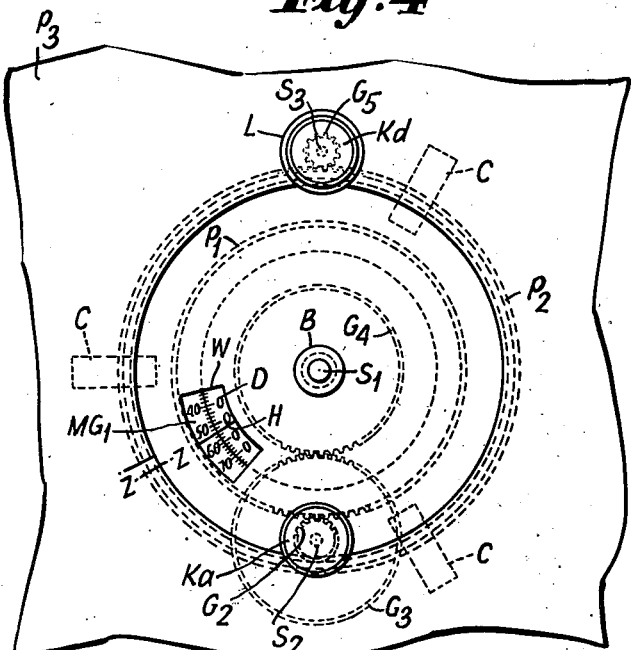

The invention is illustrated in the accompanying drawing in which Figure 1 is a part sectioned side elevation and Figure 2 a face view of one embodiment and Figures 3 and 4 are, respectively, corresponding views of another embodiment.

Referring to Figures 1 and 2 the shaft $S_1$ is coupled in any suitable way to the member (not shown) the angular position of which is to be indicated, and on this shaft $S_1$ which is the main shaft is a main scale member M in the form of an annular dial marked out with scale lines radiating from its inner edge—for example with 100 equally spaced marks over one half the periphery. The main scale member is driven, for example with a three or four to one gear ratio, by means of toothed gearing comprising one gear wheel $G_1$ fast to the said shaft $S_1$ and another gear wheel $G_2$ fast on a second, parallel shaft $S_2$ on the end of which is the usual control or drive knob (not shown). Fast on this second shaft $S_2$ (the control shaft) is a second gear wheel $G_3$ which is of larger diameter than the gear wheel $G_2$ and drives another gear $G_4$ which is free on the main shaft $S_1$ but fast with a subsidiary dial D of disc form and which may be positioned as shown in a circular recess in the middle of the main dial M. As best shown in Figure 2 the markings on the outer edge of D are closely adjacent those on the inner edge of M, limited arcs of both dials being visible from the front through a window W. The gear ratios are so chosen that the speed of rotation of the subsidiary dial D, relative to that of the control shaft $S_2$ is higher than—for example ten times as high as—that of the main shaft $S_1$ and main dial M. The subsidiary dial D is marked out with radially positioned lines extending in an inward direction from the outer edge and angularly spaced by the same amount as the marks on the main dial M. The whole periphery of the subsidiary dial D is marked as a scale so that, taking the above example, there would be 200 radial marks thereon. The scale markings on the main dial are numbered 0, 10, 20, 30, 40 . . . and so on, as in the usual way, but, in order to simplify reading, the subsidiary dial markings are numbered 0 to 0, 0 to 0, over intervals of ten divisions all round the dial each tenth mark being numbered 0. A reading member in the form of a hair line H is fixed radially with respect to both scales, spanning them radially on one side of the common centre. The hair line is preferably marked on the under face of the transparent window W (rather than on the upper face) to minimise parallax. The whole arrangement is such that one of the zero lines on the subsidiary scale is exactly under the hair line when the zero line on the main scale is thereunder. Any known means, such as the use of so-called spring loaded double gears, may be employed to minimise backlash in the gear drives. The two shafts $S_1$ $S_2$ run in bearings B and are perpendicular to a pair of fixed carrier or frame plates $P_1$ $P_2$ which are parallel to one another and carry the bearings B. R are tie rods between the plates $P_1$ $P_2$.

With the arrangement as so far described the subsidiary scale, read against the hair line, will indicate direct tenths of the individual divisions on the main scale.

If desired a knob may be provided to drive the shaft $S_1$ directly.

Obviously the inner dial could be arranged to act as the main dial and the outer dial as the subsidiary one, but the above described arrangement is preferred. Obviously also the members M and $G_1$ need not be separate for, since they rotate at the same speed they could be incorporated in the form of a gear wheel with the necessary dial markings on the face.

The invention is, of course, not limited to the particular scales described above nor to the use of a scale embracing only 180° on the main dial which can, if desired, be engraved with a scale all the way round. The 180° arrangement is however, quite satisfactory for those very common cases where the required angle of rotation of the main shaft is only 180°.

The carrier plates $P_1$ $P_2$ may be fixed in space but alternatively—and this also is illustrated in Figures 1 and 2—the said plates may be fixed only relative to one another and so arranged as to be rotatable, together, when required about the axis of the main shaft $S_1$ carrying with them the two shafts, gears and dials as a solid unit. As shown in Figures 1 and 2 the carrier or frame plates $P_1$, $P_2$ are, to this end, made of circular contour having the main shaft $S_1$ as centre, the plate $P_1$ (through which the main shaft $S_1$ passes freely) having a stepped edge to fit into a suitably formed edge in a circular aperture in a panel member $P_3$. The members C are springy plates screwed to the panel $P_3$ and bearing against the rear face of plate $P_1$. The edge of the other carrier plate $P_2$ is formed with gear teeth with which a small pinion $G_5$ meshes. This small pinion is fast on an auxiliary shaft $S_3$ which passes through a bearing B in the panel $P_3$ and carries a setting adjustment knob (not shown). A friction clamp or other suitable locking device represented schematically at L—$C_x$ is carried on the panel $P_3$ so that the carrier plate $P_1$ which fits into the panel $P_3$ can, when required, be locked relative thereto. By releasing the locking device and rotating the shaft $S_3$ the main shaft and the main and auxiliary dials can be rotated together, without relative movement. This arrangement will often be found convenient, for example where the main shaft $S_1$ is the tuning condenser shaft of a valve oscillator or other apparatus with a degree of instability. Owing to the defect of instability the calibration of the oscillator may not be very reliable after a period of time. If a standard source of frequency whose value is known is available (for example a quartz oscillator) then by suitable means it is possible to discover if the frequency of the doubtful oscillator is correct or otherwise at a given point. This can be done by setting the oscillator scale to the position at which the frequency should be equal to, or a multiple, or sub-multiple of, that of the standard source, and listening on a detector system for an interference beat. Should such a beat be heard it can be accepted that the oscillator has varied. In such case the locking device L—$C_x$ can be released and the setting adjustment shaft $S_3$ gently rotated to cause rotation of the main shaft without altering the position of that shaft with respect to the scales, and when the two sources of frequency are again matched, the locking device can be re-locked. This gives one point on the scale of the oscillator at which the frequency is correct in terms of the standard source. Depending upon the total band width of the oscillator and the position of the check point of the scale, so the error of calibration at points in the whole scale due to the re-setting will vary, but if the original calibration of the oscillator is available, calculations can be made to minimise this error.

Figures 3 and 4 show a somewhat preferred modification. In this embodiment the main dial M and gear wheel $G_1$ of Figures 1 and 2 are incorporated in a single element marked $MG_1$ which is fast on the main shaft $S_1$ and gears with a pinion $G_2$ fast on the shaft $S_2$ which is rotated by the knob $K_A$ and also has keyed on it a wheel $G_3$. The wheel $G_3$ gears with a wheel $G_4$ which is fast with the subsidiary dial D and is free to rotate on the main shaft $S_1$. The circular front plate $P_1$, stepped at its edge, fits into the panel $P_3$ as before and the back plate $P_2$ is again in the form of a gear wheel gearing with the pinion $G_5$ on the shaft $S_3$ on which is the knob $Kd$. The shaft $S_3$ passes through a bearing BM which is threaded externally for a portion of its length while another portion passes through a bush Bc in the panel $P_3$. A knurled nut L is fitted on the threaded portion of the bearing BM. A small gap is left (when the nut L is not tightened) between the end of the bush Bc and that face of the flange formed on the bearing BM which is adjacent the rear face of the panel $P_3$. If now the nut L is screwed tight the inner faces of the parts BM and Bc will clamp the plate $P_1$ and panel $P_3$ at the step and so prevent rotation of $P_1$ and $P_2$ and the parts carried thereby as a whole. By releasing L, however, the clamping action is released and rotation of the knob $Kd$ will accordingly cause rotation of $P_1$ and $P_2$ and the parts carried thereby as a whole. Z Z are datum line markings.

The main advantage of the construction of Figures 3 and 4 over that of Figures 1 and 2 is that of compactness and it is a simple matter, without making the apparatus bulky, to obtain a high gear ratio between $G_2$ and $MG_1$.

Various other modifications may be made in my invention without departing from the spirit and scope thereof and I desire therefore that only such limitations shall be placed thereon as are necessitated by the prior art and set forth in the appended claims.

Having now particularly described and ascertained the nature of my said invention and in what manner the same is to be performed, I declare that what I claim is:

1. An indicator apparatus comprising a main scale member having scale divisions marked thereon and arranged to be driven with the device whose movements are to be indicated, said main scale member having a predetermined ratio of speed of movement with respect to said device, a second scale member marked with scale divisions corresponding to those of the main scale member, means for driving second scale member with the first scale member but at a higher speed of movement, a reading member provided with a reference line whereby the positions of both scale members relative to said reading member reference line can be read off, a framework rotatable as a whole about the main scale member axis and carrying the scale members, reading member and associated driving members, and means for locking said framework in any position of rotation.

2. In an indicator device of the character described, a panel having an opening, a framework having front and rear plate members, a pair of scale-bearing members carried by said framework, means for driving said scale-bearing members at relatively different rates, said front plate member being fitted into the panel opening and supported thereby, and means for providing relative movement of the framework with respect to the panel opening.

3. In an indicator device of the character described, a panel having an opening, a framework having front and rear plate members arranged in fixed spaced relation, a pair of shafts extending transversely of and journaled in said plate members, a pair of scale-bearing members carried by one of said shafts, gearing means interposed between said shafts for driving said scale-bearing members at relatively different rates, said front plate member being fitted into the panel opening and supported thereby, and means for providing relative movement of the framework with respect to the panel opening.

4. In an indicator device of the character described, a panel having an opening, a framework having front and rear plate members arranged in fixed spaced relation, a driving shaft and a driven shaft extending transversely of and journaled in said plate members, a main scale-bearing member carried by and movable with the driven shaft, an auxiliary scale-bearing member cooperatively related to the main scale member and loosely mounted on the driven shaft, a gear train interposed between the driven shaft, the driving shaft and the auxiliary scale member for driving said scale-bearing members at relatively different rates, said front plate member being fitted into the panel opening and supported thereby, and means for providing relative movement of the framework with respect to the panel opening.

5. An indicator device as defined in claim 4, wherein the last mentioned means comprises a control shaft adapted to be controlled from the front of the panel, the rear end of the shaft having a pinion which is in mesh with a gear formed integral with the framework.

THOMAS DIXON PARKIN.